Nov. 28, 1967  F. E. EASTES  3,355,313
METHOD OF RENDERING THERMOPLASTIC MATERIAL
ANTI-FOGGING AND RESULTANT ARTICLE
Filed Aug. 24, 1964
COATING OF MIXTURE OF
1. ALKALI METAL SALT OF
   $C_5$ TO $C_{10}$ DIESTER OF
   SULFOSUCCINIC ACID AND
2. $C_{12}$ TO $C_{18}$ FATTY ACID
   MONOESTER OF POLYHYDRIC
   ALCOHOL
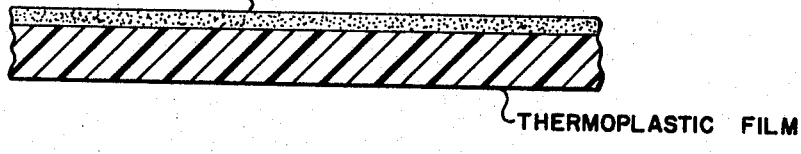
THERMOPLASTIC FILM
INVENTOR
FRANK ELISHA EASTES
ATTORNEY

United States Patent Office 3,355,313
Patented Nov. 28, 1967

3,355,313
METHOD OF RENDERING THERMOPLASTIC MATERIAL ANTI-FOGGING AND RESULTANT ARTICLE
Frank E. Eastes, Spartanburg, S.C., assignor to W. R. Grace & Co., Duncan, S.C., a corporation of Connecticut
Filed Aug. 24, 1964, Ser. No. 391,745
13 Claims. (Cl. 117—47)

This invention relates to an anti-fogging composition. In one aspect, the invention relates to improving the fogging resistance of thermoplastic films. In another aspect, the invention relates to a thermoplastic film specially adapted for wrapping moisture-containing and moisture-emitting products such as fresh meats, poultry, fresh vegetables and the like, particularly those products subjected to refrigeration while wrapped.

It has become wide-spread commercial practice in the merchandising of freshly cut meats and other produce to wrap individual items in films of transparent plastic material. The thus-wrapped products are visible through the packaging material and can be displayed, for example, in a refrigerated counter.

The characteristics of the wrapping material are very important for this type of application. The package should be attractive, and the inner surface of the plastic wrapping material must be resistant to fogging under conditions of refrigeration and during changes of temperature. Furthermore, the meat, poultry, or other product encased in such a package must remain fresh and retain its color during wrapping, display, and storage. For example, when used to encase freshly cut red meats, the package wrapping should transmit oxygen at a rate sufficient to retain the red color or so-called "bloom" of the meat. The film must also be capable of being readily and tightly sealed, preferably by heat, to substantially prevent leakage of moisture and juices contained in the completed package.

The wrapping film material should be relatively impervious to moisture in order to prevent loss of moisture from the encased product. The wrapping film also must remain flexible and tough and must not become brittle, tear, or crack during its use.

Since many polyolefin plastic films inherently possess certain desired properties, including high permeability to oxygen, low water permeability, and excellent low temperature sealability, transparent polyolefin film or sheeting offers a good material for use as a base in such packaging.

Because of other inherent properties of polyolefin films, however, principally the hydrophobic characteristics of the film surface, after moisture-containing products are encased therein water of condensation rapidly collects and remains on the inner surface of the film as droplets which result in fogging of the film and serious impairment of the transparency. In this way the appearance of the wrapped package is greatly damaged. In particular, it has been noticed that such condensation occurs more noticeably when the wrapped, moisture-containing products are subjected to temperature changes such as refrigeration after having been packaged. Subsequently, cycles of temperature changes will also produce the fogging effect in a more pronounced fashion.

In addition to having satisfactory anti-fogging properties, a completely satisfactory film for red meat wrapping and the like must also have good anti-static and anti-slip properties as well as no transfer of the coating to the meat itself. It is generally preferred that the film be in sheeted form (instead of roll form) which requires higher anti-static and improved slip properties so that the individual sheets can be removed from a stack of sheets. Although many coatings have been prepared in an attempt to employ polyolefin type films for this application the best and presently employed material is cellophane.

It is an object of the invention to provide an anti-fogging composition.

It is another object of the invention to improve the anti-fogging characteristics of thermoplastic film.

It is yet another object of the invention to provide a suitable wrapping material for moisture-emitting or moisture-containing food products.

Yet another object of the invention is to provide a composition for coating thermoplastic films so as to improve the anti-fogging, anti-static and anti-slip characteristics of thermoplastic film.

These and other objects of the invention will be readily apparent to those skilled in the art from the following description and appended claims.

The drawing shows the coated thermoplastic film.

It has now been found that a mixture of an alkali metal salt of a $C_5$ to $C_{10}$ diester of sulfosuccinic acid and a $C_{12}$–$C_{18}$ fatty acid monoester of polyhydric alcohol, such as a glycerol ester including glyceryl mannitan laurate or glyceryl monostearate, is surprisingly effective as an anti-fogging and antistatic composition for thermoplastic film.

In one embodiment, the composition is dispersed in a suitable solvent, such as $C_1$–$C_5$ alkyl alcohol or an ester of a $C_1$–$C_5$ acid and a $C_1$–$C_5$ alcohol, for example, an alkyl acetate or alkyl alcohol having 2 to 5 carbon atoms per molecule.

In another embodiment, the anti-slip properties of the film are also improved by incorporating uniformly dispersed polyvinyl chloride solids in the composition.

The coating composition is useful for any thermoplastic film which is subject to fogging. Films employed for meat wrapping generally should possess high permeability to oxygen, low moisture permeability and relatively low heat sealability so as to be leak-proof to liquids. The films should generally be as uniform as possible both in longitudinal and transverse directions. The film thickness, oxygen or moisture permeability and sealability are not limitative and depends on the end use for the coated product. In general, the sheeting or film material which is a base for the composition of this invention, is in the range of 0.25 to about 5 mils in thickness, more preferably of 0.5 to 1.5 mils.

In general, the composition is useful for any polymer wetted by the composition. Suitable synthetic thermoplastic polymers include the polymers of the monoolefins having 2 to 8 carbon atoms per molecule including ethylene, propylene, butene-1, pentene-1, hexene-1, heptene-1, octene-1 and mixtures thereof with each other and other copolymerizable monomers having a $CH_2{=}C{<}$ group such as divinylbenzene, isopentene, vinylcyclohexene, allyl benzene, styrene, allyl naphthalene, and the like; 1,1-disubstituted ethylenes such as alpha-methyl styrene and the like; 1,2-disubstituted ethylene such as indene, cyclohexene, 2-pentene and the like; conjugated dienes such as 1,3-butadiene, 1,3-pentadiene, cyclopentadiene and the like; unconjugated dienes such as 1,5-hexadiene, dicyclopentadiene and the like; acetylenes, chloroolefins, ethers, and epoxides; esters such as vinyl butyrate, vinyl acetate, and methyl acrylate; and nitrogen compounds such as 4-vinyl pyridene, acrylonitrile and the like. Other suitable polymers are the polyamides (nylon) and the polyvinyl chloride polymers and the copolymers of vinyl chloride and other ethylenically unsaturated monomers including the vinyl esters such as vinyl acetate, vinylbutyrate, vinyl benzoate and the like; the vinyl ethers such as vinyl ether, vinyl chloroethyl ether, vinyl phenyl ether and the like; the ketones such as vinyl methyl ketone, vinyl phenyl ketone and the like; the vinylidene halides such as vinylidene chloride 1-fluoro-1-chloroethylene and the like; the acrylic compounds such as acrylonitrile, chloroacrylonitrile, methyl acrylate, methyl methacrylate, 2-ethylhexyl acrylate and the like; the allylic compounds such as allylidene diacetate, chloroallylidene diacetate and the like; and other mono-unsaturated compounds. Preferred polymers are polyethylene, polypropylene, polyamides (e.g., nylon) and copolymers of vinylidene chloride (Saran).

The term polymer as used herein includes homopolymers, copolymers, terpolymers, block copolymers and the like.

In addition, the polymer surface to be treated may be a surface coating of another polymer such as a coating of a copolymer of vinylidene chloride and a vinyl chloride on a pellicle.

In addition, the term "polymer" includes laminates. In general, the polymer may be unoriented or oriented in one or both directions by any suitable expedient such as by stretching, inflating, or the like prior to treatment. In addition, the polymer may be irradiated prior to or after orientation, or non-oriented, such as by the method described in the patent to W. G. Baird, Jr., et al., U.S. 3,022,543 and Rainer et al., U.S. 2,877,500.

A particularly preferred film to be employed for a base for the composition is polyethylene irradiated by the method described in Baird and Rainer et al., supra, to a dosage of 2 to 15 megarads and biaxially oriented by inflation techniques well known to those skilled in the art.

It has been surprisingly found that although the fatty acid monoesters are well known wetting agents, as are the diesters of sulfosuccinic acid, that neither of these materials are satisfactory by themselves and that both must be present in certain critical amounts to provide satisfactory anti-fog and anti-static characteristics to the film. A suitable composition contains about 0.05 to 0.75 weight percent, more preferably 0.1 to 0.5 weight percent of the fatty acid esters although there is actually no upper limit on the amount if the user can tolerate the greasy feel in the polymer; the critical range for the diesters of sulfosuccinic acid is 0.01 to 0.5 weight percent based on total composition weight. After the solvent is removed by drying, the preferred composition provides a deposit of about $9.6 \times 10^{-4}$ gm./ft.$^2$ of the fatty acid esters and about $1.6 \times 10^{-4}$ gm./ft.$^2$ of the diesters of sulfosuccinic acid on the surface of the film. Surprisingly, there are definite critical limits on the amounts of either of these components that must be present on the film surface. The critical range for the fatty acid esters is about $3 \times 10^{-4}$ to $3 \times 10^{-3}$ gm./ft.$^2$; the critical range for the diesters is about $3.0 \times 10^{-5}$ to about $1.5 \times 10^{-3}$ g./ft.$^2$. The active ingredients of the coating composition may be applied to the film from a suitable solvent or dispersant, such as a lower alkyl ester or alkyl alcohol, preferably n-propyl acetate, at a total concentration of solids of 0.1 to 5 percent, preferably at about 0.2 to 1, weight percent based on the weight of the total solution.

For applications employing sheeted film, such as meat wrapping operations, it is desirable to incorporate in the coating composition a finely divided uniformly dispersed polyvinyl chloride of about 0.1 to 5 microns in diameter. At least about $1 \times 10^{-4}$ gm./ft.$^2$ of the polyvinyl chloride is necessary to substantially improve the characteristics of the film, preferably at least about $5 \times 10^{-4}$ gm./ft.$^2$ of the polyvinyl chloride is contained in the coating composition on the surface of the film. There is no upper limit except that an excessive amount results in a haze. With the coating solution, it is preferred that at least about 0.05 to 2.0 weight percent more preferably about 0.1 to about 0.5, weight percent of the polyvinyl chloride be employed. It has been found that atmospheric conditions, including humidity, are a factor in determining the amount of the anti-slip composition employed.

While the ratio of the wetting agents present in the coating composition is not critical, it has been discovered that a weight ratio of from 10:1 to 1:1 parts by weight of the glyceryl mannitan laurate to the sodium dioctyl sulfosuccinate is quite adequate. The total coating thickness is preferably in the range of about $1 \times 10^{-4}$ to about $1 \times 10^{-2}$ gm./ft.$^2$.

In addition to sodium dioctyl sulfosuccinate other $C_5$ to $C_{10}$ diesters may be employed, such as sodium dihexyl sulfosuccinate; a suitable substitute for glyceryl mannitan laurate is glyceryl monostearate.

Although not essential for production of an improved film having improved anti-fogging characteristics, it has been found that subjection of the film prior to coating to corona discharge treatment improves the resistance of the coating to transfer to an adjacent coating. In addition to corona discharge, other types of treatment such as electrical discharge or flame treatment may be employed for improving the adhesion characteristics of film.

It is generally preferred to coat only one side with the anti-fogging composition, that is, only the side that will be applied to the article being wrapped; however, if desired, both surfaces may be coated without significant adverse effect, since coating compositions containing the active ingredients within the critical limits of this invention do not degrade the heat sealing properties of the film to any appreciable extent. On the other hand, if the concentrations of the ingredients are greater than the critical limits specified, the resulting coated film will be excessively tacky and have poor heat sealing properties, particularly if the concentration of sodium dioctyl sulfosuccinate is excessive.

It is contemplated that the coating composition for the films and sheeting materials and the process of applying such coating compositions to film surfaces, including but without limitation thereto film, sheeting material, and the like, are novel. It is also contemplated that the coated polyolefin structures are themselves novel as well as the sealed packages, structures, and containers formed therefrom, either with or without the encasement of the products therein.

While certain examples, structures, composition and process steps have been described for purposes of illustration, the invention is not limited to these. Variation and modification within the scope of the disclosure and the claims can readily be effected by those skilled in the art.

The invention is best illustrated by the following examples:

EXAMPLE I

Polyethylene film, 0.75 mil thick with a density of 0.940, was extruded as a thick tube, crosslinked with 6 megarads irradiation and then biaxially oriented. The film was then corona treated with 1.4 amps current with a Lepal treater, Model HFSG-2, and coated on the treated surface at 400 ft./min. with a coating solution having the following composition:

|   | Percent |
|---|---|
| n-Propyl acetate | 99.50 |
| Sodium dioctyl sulfosuccinate [1] | 0.05 |
| Glyceryl mannitan laurate [2] | 0.3 |
| Polyvinyl chloride powder [3] | 0.15 |

[1] Aerosol OT, American Cyanamid Co.
[2] NNO, Atlas Powder Co.
[3] Geon 121, B. F. Goodrich.

During the coating 0.32 gm./ft.$^2$ of the coating solution was applied by use of a gravure roll applicator. The solvent was immediately removed by drying the film at 145° F., and the film was then collected in roll form. The film had a coating of 0.0016 gm./ft.$^2$ after drying. The roll film was subsequently slit and cut into sheets of various dimensions; the sheets collected into stacks of 1,000 sheets each; and the stacks of film wrapped in brown paper and stored for one month at about 100° F. After being stored the sheeted film was examined and found to be easily separated by one hand as individual sheets. It had a high degree of slip and, being electrically conductive, generated no static electricity when the sheets were being separated. This film had excellent antifog properties on the coated side and was found to be quite suitable for hand wrapping of fresh meat for show case display, providing the coated surface is placed on the inside of the package to avoid fogging of the inner surface of the package by condensed moisture from the meat. The meat sealing properties of this coated film were found to be comparable to those of similarly prepared biaxially oriented film without the antifog-antistatic coating, when similar sealing conditions are used. Since this film is biaxially oriented, packages wrapped with it may be heat shrunk, if desired.

A control run was made using the same type base film, coating conditions and coating solution as in Example I, except that the sodium dioctyl sulfosuccinate was omitted. Immediately after being coated, the film was resistant to antistatic build-up and had excellent slip and antifog properties. However, after being cut into sheets and stored in stacks of 1,000 sheets at room temperature for four days, the film lost its antistatic and antifog properties and was difficult to separate as individual sheets from the stacks because of "cling" resulting from static electricity generated as the adjacent sheets rubbed together on being separated.

Another control test was run using the same type base film and coating conditions as in Example I except that a coating solution having the following composition was used:

| | Percent |
|---|---|
| n-Propyl acetate | 99.75 |
| Sodium dioctyl sulfosuccinate | 0.1 |
| Polyvinyl chloride powder | 0.15 |

Sheets of the resulting coated film were found to resist antifogging on the coated side and to have a high degree of slip, but were electrically non-conductive and very prone to generate static electricity, hence, difficult to separate as individual sheets from a stack. This film might be used satisfactorily in wrapping fresh meat and other moist products, providing the speed of the packaging operation is of no concern.

Another control test was run using the general conditions of Example I, except the coating solution had the following composition:

| | Wt. percent |
|---|---|
| n-Propyl acetate | 98.6 |
| Glyceryl mannitan laurate | 0.75 |
| Sodium dioctyl sulfosuccinate | 0.5 |
| Polyvinyl chloride powder | 0.15 |

Sheets of the resulting coated film were found to be antistatic and antifogging resistant but very difficult to separate from a stack because of high tack between adjacent sheets. (Apparently, the somewhat oily ingredients of the coating adhered the sheets together.) The film was found to have reduced heat sealability (seal strength), compared to the sheets coated at lower concentrations and was less satisfactory for many packaging applications. This further demonstrates the criticality of the composition.

EXAMPLE II

Biaxially oriented, cross-linked polyethylene [a] film (having a density of 0.920 gm./cc. and a thickness of 1 mil) was corona treated as described in Example I and then coated on one surface with 0.32 gm./ft.$^2$ of a coating of the following composition:

| | Percent |
|---|---|
| n-Propyl acetate | 98.30 |
| Glyceryl mannitan laurate | 0.15 |
| Sodium dioctyl sulfosuccinate | 0.05 |
| IPI varnish E–89874 [1] | 1.5 |

[a] L Film—CRYOVAC Division, W. R. Grace & Co.
[1] An overprint varnish containing a mixture of nitrocellulose and shellac in a solvent mixture composed of lower aliphatic alcohols and esters produced by Interchemical Corporation.

After drying the film to remove the coating solvent, the film was collected in roll form, slit into rolls of various sizes and stored at room temperature for a week. Upon examining the film after storage, there was no indication of any transfer of the coating to the uncoated side of the film, even though the slit rolls were moved under high tension. The film was printed in the usual manner on the uncoated surface of the film to obtain rolls of printed film with good adhesion. The presence of the coating on the film did not interfere with the printing operation in any manner. The printed film was found to have excellent antifog properties on the coated surface and, being electrically conductive, was free of static electricity. Such printed antifog film is especially useful in roll form for wrapping frankfurters on high speed packing machines, since it feeds freely from the roll and through the packaging machine without "static cling," and can be readily heat sealed to yield a strong package, the inner surface of which remains free of fog on prolonged storage at near freezing temperatures.

EXAMPLE III

The run of Example II was duplicated, except with the following coating composition:

| | Wt. percent |
|---|---|
| n-Propyl acetate | 98.8 |
| Sodium dioctyl sulfosuccinate | 0.05 |
| Glyceryl monostearate [1] | 0.15 |
| IPI varnish E–89874 | 1.0 |

[1] C. P. Hall, Chicago, Ill.

The results were essentially the same as those described in Example II.

I claim:
1. An article comprising:
 (a) a polyethylene film coated with
 (b) about $1\times10^{-4}$ to about $1\times10^{-2}$ gm./ft.$^2$ of a uniform admixture of:
  (1) finely divided polyvinyl chloride,
  (2) between about $3.0\times10^{-5}$ to about $1.5\times10^{-3}$ gm./ft.$^2$ of sodium dioctyl sulfosuccinate,
  (3) between about $3.0\times10^{-4}$ to about $3.0\times10^{-3}$ gm./ft.$^2$ of glyceryl mannitan laurate, and
  (4) the weight ratio of (3) to (2) being between from 10:1 to 1:1.
2. An article comprising:
 (a) a thermoplastic material coated with a coating containing,
 (b) between about $3.0\times10^{-5}$ to about $1.5\times10^{-3}$ gm./ft.$^2$ of an alkali metal salt of a $C_5$ to $C_{10}$ diester of sulfosuccinic acid,
 (c) between about $3.0\times10^{-4}$ to about $3.0\times10^{-3}$ gm./ft.$^2$ of a $C_{12}$ to $C_{18}$ fatty acid monoester of polyhydric alcohol, and
 (d) the weight ratio of amounts of (c) to (b) being from 10:1 to 1:1.
3. The article of claim 2 wherein said diester of sulfosuccinic acid comprises sodium dioctyl sulfosuccinate.
4. The article of claim 2 wherein said monoester of polyhydric alcohol comprises glyceryl mannitan laurate.
5. The article of claim 2 wherein said monoester comprises glyceryl monostearate.
6. The article of claim 2 wherein said coating also contains finely divided polyvinyl chloride in amounts sufficient to improve the slip characteristics of the article.
7. The article of claim 6 wherein said polyvinyl chloride is present in an amount of at least $1\times10^{-4}$ gm./ft.$^2$ but less than the amount which produces a haze.
8. The article of claim 2 having a coating of $1\times10^{-4}$ to $1\times10^{-2}$ gm./ft.$^2$.
9. A process for improving the antifogging characteristics of a thermoplastic material comprising coating said thermoplastic with the coating of claim 2.
10. A process for improving the antifogging characteristics of a thermoplastic material comprising:
 (a) uniformly dispersing 0.05 to 75 percent of glyceryl mannitan laurate and 0.01 to 0.5 weight percent sodium dioctyl sulfosuccinate in n-propyl acetate, the ratio of the former to the latter being 10:1 to 1:1,

(b) coating said thermoplastic with the resultant dispersion, and
(c) evaporating said n-propyl acetate.

11. A process for improving the antifogging characteristics of a thermoplastic material comprising:
   (a) uniformly dispersing 0.05 to 2.0 weight percent of finely divided polyvinyl chloride in n-propyl acetate to form dispersion A,
   (b) dispersing 0.05 to 0.15 weight percent of glyceryl mannitan laurate and 0.01 to 0.5 weight percent of sodium dioctyl sulfosuccinate in dispersion A to form dispersion B, the ratio of the former to the latter being 10:1 to 1:1,
   (c) coating said thermoplastic with a coating of dispersion B, and
   (d) evaporating said n-propyl acetate.

12. The process of claim 11 wherein said thermoplastic is subjected to electrical discharge treatment prior to coating.

13. A process for improving the antifogging characteristics of polyethylene film comprising:
   (a) subjecting at least one surface of said film to corona discharge treatment,
   (b) dissolving 0.01 to 0.5 weight percent of a sodium diester of sulfosuccinic acid and 0.05 to 0.75 weight percent of glyceryl mannitan laurate in a solvent selected from the group consisting of alkyl alcohols and alkyl acetates having 2 to 5 carbon atoms per molecule to form solution A, the ratio of the latter to the former being 10:1 to 1:1,
   (c) uniformly dispersing 0.05 to 2.0 weight percent finely divided polyvinyl chloride in solution A to form solution B,
   (d) coating the corona treated film surface with solution B, and
   (e) removing substantially all of said solvent from said coating by drying.

References Cited
UNITED STATES PATENTS

| | | | |
|---|---|---|---|
| 2,561,010 | 7/1951 | Carson | 106—13 |
| 2,648,097 | 8/1953 | Kritchever | 117—47 R |
| 3,048,266 | 8/1962 | Hachhell et al. | 106—13 |
| 3,222,191 | 12/1965 | Steiner et al. | 117—1388 E |
| 3,303,049 | 2/1967 | Hill | 106—13 |
| 3,306,755 | 2/1967 | Sincock et al. | 106—13 |

MURRAY KATZ, *Primary Examiner.*

UNITED STATES PATENT OFFICE

CERTIFICATE OF CORRECTION

Patent No. 3,355,313　　　　　　　　　　　　November 28, 1967

Frank E. Eastes

It is hereby certified that error appears in the above numbered patent requiring correction and that the said Letters Patent should read as corrected below.

Column 6, line 72, for "75" read -- 0.75 --; column 7, line 9, for "0.15" read -- 0.75 --.

Signed and sealed this 7th day of January 1969.

(SEAL)
Attest:

Edward M. Fletcher, Jr.　　　　　　　　　　　EDWARD J. BRENNER
Attesting Officer　　　　　　　　　　　　　　Commissioner of Patents